(12) United States Patent
Eiva

(10) Patent No.: US 6,852,257 B2
(45) Date of Patent: Feb. 8, 2005

(54) METHOD FOR OPERATING EXTRUDER TEMPERATURE CONTROLLER WITH STABLE TEMPERATURE RESET

(75) Inventor: Saulius Tomas Eiva, Ashaway, RI (US)

(73) Assignee: Davis-Standard Corporation, Pawcatuck, CT (US)

(*) Notice: Subject to any disclaimer, the term of this patent is extended or adjusted under 35 U.S.C. 154(b) by 394 days.

(21) Appl. No.: 10/182,505

(22) PCT Filed: Feb. 8, 2001

(86) PCT No.: PCT/US01/04365
§ 371 (c)(1),
(2), (4) Date: Jul. 29, 2002

(87) PCT Pub. No.: WO01/58668
PCT Pub. Date: Aug. 16, 2001

(65) Prior Publication Data
US 2003/0030166 A1 Feb. 13, 2003

Related U.S. Application Data

(60) Provisional application No. 60/181,202, filed on Feb. 9, 2000.

(51) Int. Cl.[7] ............................................... B29C 47/92
(52) U.S. Cl. ..................... 264/40.6; 264/40.7; 425/144; 366/145
(58) Field of Search .............................. 264/40.1, 40.6, 264/40.7; 425/135, 143, 144, 154, 170, 162; 366/145; 364/502

(56) References Cited

U.S. PATENT DOCUMENTS

| | | | |
|---|---|---|---|
| 3,751,014 A | 8/1973 | Waterloo | 259/191 |
| 3,866,669 A | 2/1975 | Gardiner | 165/27 |
| 4,262,737 A | 4/1981 | Faillace | 165/12 |
| 4,437,046 A * | 3/1984 | Faillace | 318/571 |
| RE31,903 E | 6/1985 | Faillace | 165/12 |
| 5,149,193 A | 9/1992 | Faillace | 366/145 |
| 6,755,564 B2 * | 6/2004 | Eiva | 366/145 |

FOREIGN PATENT DOCUMENTS

| | | |
|---|---|---|
| EP | 0 089 130 B1 * | 9/1983 |
| EP | 0 522 137 B1 * | 2/1997 |

OTHER PUBLICATIONS

Dual–Therm Discrete Control Technology—Davis–Standard, Process Engineering News Focus, pp. 13, 22, 24, 26, and 29 (1998).

* cited by examiner

Primary Examiner—Mark Eashoo
(74) Attorney, Agent, or Firm—Daniel Reitenbach

(57) ABSTRACT

The invention is a method for operating an extruder temperature controller. The method can include sensing an actual screw speed for an extruder screw in an extruder barrel. The extruder barrel has at least one heat exchange means. The method can then involve indexing and storing a plurality of screw speeds. Each of the stored screw speeds corresponds to a temperature reset value. Comparing the actual screw speed with each of the stored screw speeds can then be performed. Selecting one of the stored screw speeds can then occur. The selected screw speed is a member of the plurality of stored screw speeds having a value most arithmetically equivalent to the actual screw speed. The step of selecting retrieves the temperature reset value corresponding to the selected, stored screw speed. Generating a control output driver signal to the heat exchange means can occur. The control output driver signal is responsive to the retrieved temperature reset value. The invention includes delaying a control alarm for a predetermined time when generating a control output driver signal to the heat exchange means is at or near maximum capacity.

10 Claims, 3 Drawing Sheets

METHOD FOR OPERATING EXTRUDER TEMPERATURE CONTROLLER WITH STABLE TEMPERATURE RESET

This application claims the benefit of Provisional Application No. 60/181,202, filed Feb. 9, 2000.

BACKGROUND OF THE INVENTION

1. Field of the Invention

The invention relates to a method for operating an extruder temperature controller with a stable temperature reset for an extrusion device. Specifically, the invention relates to a method for operating an extruder temperature controller to control the temperature of molten extrudate wherein the control alarm is delayed for a predetermined time when generating a control output driver signal to the heat exchange means at or near maximum capacity of an extruder system.

2. Description of the Background Art

Extrusion devices are often used in the plastics or other industries to continuously melt, blend, form, and solidify plastics or other materials into a desired shape. Typical extrusion devices include a rotating screw housed coaxially within a heated, cylindrically-shaped barrel. The screw rotates within the barrel and drives an extrusion material such as plastic through the barrel. The extrusion material is forced through a die or aperture at the end of the barrel. A temperature drop, that occurs when the extrusion material leaves the heated barrel, allows the material to solidify in a molded shape that is determined by the profile of the die.

The temperature of the extrusion material or plastic within the extruder barrel must be controlled so as to remain as near to a desired temperature as possible. An extruder barrel can be operated to control the temperature of the extrusion material within the barrel under one or more of three conditions. An extruder barrel can (1) add heat to a material, (2) extract heat from a material, or (3) maintain the heat of a material. The third condition of maintaining a temperature of an extrusion material occurs when an extruder is operated at a speed wherein the heat from the friction of the extrusion material created, as the material is processed in the extruder barrel, is approximately equal to the heat loss from the extruder barrel. This condition of no heat gain or loss in known as an "adiabatic" condition.

Most extrusion devices have a plurality of heat exchange zones. The temperature of each heat exchange zone can be independently controlled such that one or more heat exchange zones heat the material being processed while the remaining heat exchange zones are in an adiabatic condition or are cooling the extrusion material. It is common for a heat exchange zone near the end of an extruder barrel to be used to cool an extrusion material before the material is extruded through the die. This procedure allows the extrusion material to quickly solidify upon existing the die. An extruder barrel, typically, has eight heat exchange zones, but the number of zones can vary.

An extruder device can control the temperature of its extruder barrel with heat exchange elements. The extruder barrel is surrounded by a shell containing heat exchange elements. The heat exchange elements can be (1) heaters such as resistive heaters which increase the extruder barrel temperature and (2) cooling tubes for circulating water or another coolant in order to decrease the extruder barrel temperature. Alternative heat exchange elements can be used. For example, the cooling structure can be a finned shell with a blower that circulates air past the fins.

Temperature sensors, such as thermocouples, are positioned in extruder barrels to signal the temperature at the location of the sensor. Two thermocouples per barrel zone are usually provided and are electrically isolated from one another. A first thermocouple is known as the "A" thermocouple of the pair and is placed at the inner surface of the extruder barrel. A second thermocouple is known as the "B" thermocouple of the pair and is placed in the interior of the heater/cooler shell. Each zone of the extruder is similarly provided with a pair of thermocouples, A and B, similarly placed. An air-cooled extruder system also has the B thermocouple in the interior of the shell.

An extruder temperature controller receives signals from the temperature sensors. The extruder temperature controller determines whether the temperature of a given heat exchange zone is too cool or too hot and, if necessary, signals the appropriate heat exchange elements to increase or decrease the heat in the particular zone regulated by that controller.

The extruder barrel and the heat exchange elements are heat sinks and, thereby, cause a delay between the signalling of instructions by the extruder temperature controller to increase or decrease the temperature of a zone. For example, when the extruder temperature controller instructs a heating element to cease applying heat, energy stored in the heating element continues to warm that zone of the extruder barrel. This continued warming causes the extruder barrel temperature to continue to rise in that zone. The lag between the issuance of an instruction from the extruder temperature controller and the response from the heat exchange elements causes the extruder barrel temperature to oscillate about the desired temperature.

U.S. Pat. No. 3,866,669 to Gardiner and U.S. Pat. No. 3,751,014 to Waterloo both address the problem of oscillating extruder barrel temperatures. In the systems described in Gardiner and Waterloo patents, a first temperature probe or thermocouple provides a "deep" temperature measurement representative of the temperature of the extrusion material. A second thermocouple is positioned within the shell surrounding the extruder barrel to provide a "sl allow" temperature measurement representative of the temperature of the heat exchange elements. The electrical signals from the pair of thermocouples are combined to provide an average value. The extruder temperature controller monitors the average value and selectively activates the heating and cooling elements to maintain the average value at a temperature that is approximately equal to a setpoint representative of the desired temperature for the extrusion material.

The control of the heat exchange elements by an extruder temperature controller that is responsive to an average value for temperature rather than the actual temperature of the extrusion material, that is being processed, reduces temperature and/or control signal oscillations. An example of such a temperature oscillation occurs during operational conditions wherein a resistive heating element applies heat to increase the temperature of an extruder barrel. While the heating element is active, the shallow temperature measurement is higher than the deep temperature measurement. This temperature difference occurs because the shallow temperature probe is positioned in the vicinity of the activated heating element. Accordingly, the average value of the extruder temperature controller is also greater than the deep measurement or the actual temperature of the extrusion material. The average value reaches the temperature setpoint while the actual temperature of the extrusion material is still below the desired temperature. The extruder temperature controller inactivates the heating element after the average value reaches the temperature setpoint, but before the extrusion material reaches the desired temperature. The heat stored in the heating element continues to raise the temperature of the extrusion material toward the desired temperature. Such temperature oscillations can also occur during operational conditions wherein the temperature of the extrusion material is being decreased.

Inactivating the heat exchange elements before the extrusion material has reached the desired temperature prevents the temperature of the extrusion material from "overshooting" the desired temperature which can cause undesirable temperature oscillations. This advantage is achieved at the expense of a reduction in the accuracy with which the temperature of the extrusion material is controlled. More specifically, since the extruder temperature controller operates to correct the temperature only when the average temperature value deviates from the desired temperature, the extruder temperature controller may not attempt to adjust the temperature, even when the temperature of the extrusion material remains below a desired elevated temperature or above a desired cooling temperature.

U.S. Reissue Pat. No. Re. 31,903 to Faillace describes an extruder temperature controller which anticipates changes of temperature in an extruder barrel. This system monitors an average temperature value to determine when the temperature has not changed significantly for a specified length of time or when the system has "stabilized." Once the system has stabilized, this extruder temperature controller examines the actual temperature of the extrusion material as indicated by the deep measurement and compares the actual temperature to the desired temperature. If the actual temperature is significantly different from the desired temperature, this extruder temperature controller calculates and changes the temperature setpoint so that the average value appears to require a temperature adjustment. If the actual extrusion material temperature is, for example, too low, the Faillace extruder temperature controller raises the setpoint above the desired temperature. The average value is then below the setpoint, which causes the extruder temperature controller to adjust the temperature until the average value is approximately equal to the temperature setpoint.

Changes in the rotational speed of the extruder screw or "screw speed" are normal during the start-up and the shutdown of an extrusion line. However, rotational screw speed changes typically cause a thermal load variation which is troublesome in an extrusion process. An example of this condition occurs in blow molding processes wherein the molded piece becomes jammed when existing the mold. Sensors, which detect the jammed piece, rapidly shutdown the extruder system in order to prevent further jams and potential damage to the mold system. The extruder system during normal operation in a blow molding process runs at a preset speed.

The extruder temperature controller of the Faillace Reissue Patent in a blow molding process resolves a reset value for each heat exchange zone. The reset value is proportional to the temperature offset for that heat exchange zone, which is proportional to the thermal load for that heat exchange zone. The Faillace extruder temperature controller resolves a reset value for each heat exchange zone individually.

When an extruder system for a blow molding process, using the controller of the Faillace Reissue Patent, is stopped due to a jam, it is typically restarted within a few minutes. The minimum time a heat exchange zone must be stable in control or "minimum reset stability time" is approximately four minutes. The actual time during which a heat exchange zone recovers from a step change in load, such as a sudden stop condition, is approximately 10 to 12 minutes. Therefore, the reset means in the Faillace extruder temperature controller cannot respond quickly enough to compensate for a step change in load which lasts for less than 10 to 12 minutes. The result of this condition is that a heat exchange zone is offset in temperature equal to the difference in thermal load at the normal running screw speed compared to the screw speed at stop. In addition, if the extruder system remains stopped for a period of time which allows the reset to actuate, such as when a jammed piece is cleared and the extruder system returns to a normal operating screw speed, the incorrect heat exchange zone temperature reset value causes a temperature offset. This temperature offset remains until a reset value can be resolved at the normal screw speed and compensates for the thermal load at that screw speed. This condition in a blow molding process causes a significant change in the characteristics of the plastic melt output of the extruder system. These changes cause a variation in the weight of the blow molded products. This variation can degrade the quality of the end product by causing variations in the wall thickness of the product. These variations in quality cause waste, inefficiency, and undue expense.

U.S. Pat. No. 5,149,193 to Faillace discloses an extruder temperature controller that preempts a temperature control set point for a heat exchange zone upon a change in the screw speed of the extruder system. This extruder temperature controller adjusts the control setpoint, in response to a change in the screw speed, which enables the controller to preempt an adverse change in the extruder barrel temperature and the temperature of the extrusion material in the barrel. The storing of a collection of previously calculated control setpoints for various screw speeds enables this extruder temperature controller to determine the appropriate control setpoint quickly by retrieving from memory the control setpoint corresponding to the current or actual screw speed. The previously calculated control setpoints enable an extruder system to avoid significant changes in temperature of the extrusion material or barrel temperature fluctuations both of which often accompany a search for a control setpoint to provide the desired barrel temperature.

The improved controller of the Faillace '193 patent permits heat exchange zone "reset value tables" to be entered for each profile. Upon selection of the profile number, the corresponding reset value tables are also selected. Also, the adaptive reset capability of this controller allows for deep and shallow temperature control with temperature reset to be applied to a plastic extrusion process where the screw speed of the extruder can change on a continual or unanticipated basis. This controller maintains the barrel temperature control, typically, within 1° F. of temperature stability at all operating screw speeds. The adaptive reset capability of this controller improves the plastic melt output of a extruder system during continual or unanticipated changes in operating screw speed. This capability greatly reduces the time to stabilize the heat exchange zone temperature control after a change in screw speed has occurred and improves product quality during start-up and shutdown of an extrusion process line and reduces scrap.

The extruder temperature controller of the Faillace '193 patent triggers a control alarm when the heating output reaches 100 percent. The control alarm resets the stability timer and a new reset is not calculated for the predetermined time of three or four minutes. This characteristic unnecessarily limits the extruder system from operating at or near 100 percent of its heating capability. This controller does not "learn" new reset values for screw speeds when the extruder barrel temperature is stable and does not clear stored screw speeds when a significant process change is detected.

The industry is lacking a method for operating a temperature controller for an extruder system with an adaptive reset capability and a dual sensor temperature controller that permits the extruder system to operate at or near its maximum heating capacity. Further, the industry lacks a method for operating a controller that learns new reset values for screw speeds when the extruder barrel temperature is stable and/or clears stored screw speeds when a significant process change is detected.

SUMMARY OF THE INVENTION

The invention is a method for operating an extruder temperature controller. The method can include sensing an actual screw speed for an extruder screw in an extruder barrel. The extruder barrel has at least one heat exchange means. The method can then involve indexing and storing a plurality of screw speeds. Each of the stored screw speeds corresponds to a temperature reset value. Comparing the actual screw speed with each of the stored screw speeds can then be performed. Selecting one of the stored screw speeds can then occur. The selected screw speed is a member of the plurality of stored screw speeds having a value most arithmetically equivalent to the actual screw speed. The step of selecting retrieves the temperature reset value corresponding to the selected, stored screw speed. Generating a control output driver signal to the heat exchange means can occur. The control output driver signal is responsive to the retrieved temperature reset value. The invention includes delaying a control alarm for a predetermined time when generating a control output driver signal to the heat exchange means is at or near maximum capacity.

DESCRIPTION OF THE PREFERRED EMBODIMENT

Figure 1:
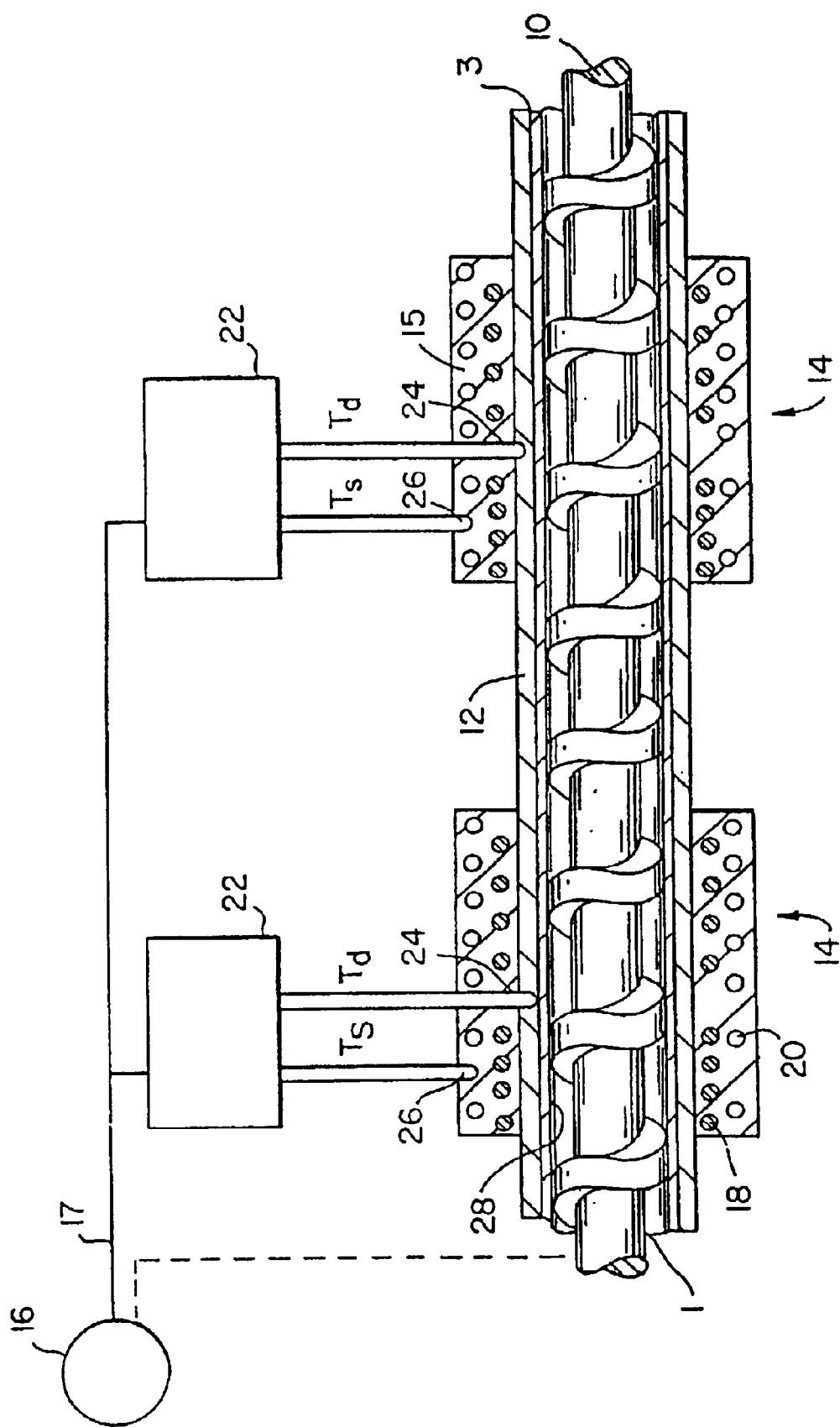
FIG. 1 is a cross-sectional side view of an extruder barrel including an extruder temperature controller operated by the method of the invention.

The invention includes a method for operating an extruder temperature controller. The method includes sensing an actual screw speed for an extruder screw in an extruder barrel. The extruder barrel has at least one heat exchange means. The method then involves indexing and storing a plurality of screw speeds. Each of the stored screw speeds corresponds to a temperature reset value. Comparing the actual screw speed with each of the stored screw speeds is performed. Selecting one of the stored screw speeds then occurs. The selected screw speed is a member of the plurality of stored screw speeds having a value most arithmetically equivalent to the actual screw speed. The step of selecting retrieves the temperature reset value corresponding to the selected, stored screw speed. Generating a control output driver signal to the heat exchange means occurs. The control output driver signal is responsive to the retrieved temperature reset value. The invention further includes delaying a control alarm for a predetermined time when generating a control output driver signal to the heat exchange means is at or near maximum capacity.

The term "reset value" for purposes of this invention corresponds to screw speed and not barrel temperature. A reset value is determined for a stable screw speed and is stored in the extruder temperature controller in association with a temperature setpoint. There is no manual input of a reset value with the desirable embodiments of this invention. Reset values are either zero or a resolved value. Typically, a reset value is resolved for each extruder barrel zone according to the thermodynamic load on an extruder system during a normal operating phase.

The invention desirably includes a step of determining actual screw speed. The step for determining actual screw speed can be performed by an electronic or an electromechanical means for sensing the revolutions per unit of time of the extruder screw. A suitable means for determining actual screw speed includes commercially available digital encoders or tachometers that are adapted to provide an actual screw speed input signal for the extruder temperature controller.

The extruder temperature controller performs the step of storing a plurality of screw speeds. A means for storing must store screw speeds wherein each stored screw speed corresponds to a specific or actual temperature reset value for each extruder barrel zone for each screw speed. The independent screw speeds with their corresponding actual temperature reset value are entered by a reset value signal input means for inputting a temperature reset value input signal that is representative of a desired, actual temperature reset value per extruder barrel zone for each stored screw speed. The means for storing is, desirably, an electronic storage means. Suitable storage means are known in the art and can be adapted for use with this invention by those skilled in the art of this invention.

The extruder temperature controller conducts the step of comparing and selecting from the plurality of stored screw speeds. A means for comparing and selecting compares the actual screw speed to each member of the plurality of stored screw speeds. The means for comparing and selecting selects the stored screw speed that is most nearly equivalent to the actual screw speed. If the difference between an actual temperature for a heat exchange zone and actual temperature reset value for the selected stored screw speed is significant, the extruder temperature controller defaults to or selects the selected, stored screw speed. The actual temperature reset value that corresponds to this default or selected screw speed is used by the extruder temperature controller to derive a new temperature "individual reset value" for each extruder barrel zone.

The invention further performs the step of generating a control output driver signal to a heat exchange means. A means for generating a control output driver signal includes a means for transmitting a control output driver signal to each heat exchange zone in the extruder barrel of an extruder system. The means for generating the control output driver signal is responsive to the stored temperature reset value output signal that corresponds to the default screw speed. The means for generating a control output driver signal includes a means for varying the control output driver signal in response to a revised reset value for each heat exchange zone. The control output driver signal controls or operates the heat exchange means for each heat exchange zone. The means for generating a control output driver signal, typically, is programmed to vary the control output driver signal to the heat exchange means such that the actual temperature of a heat exchange zone, which influences the temperature of the extrusion material, is not altered when the extruder screw changes speed. Numerous other factors, for example, the pressure, the friction of an extrusion material within an extruder barrel, and the type of material being extruded, effect the actual temperature of an extrusion material.

The most desirable embodiments of the invention include extruder systems having an adaptive reset temperature controller operated by the method of this invention utilized in conjunction with at least one other extruder temperature controller that continuously monitors, compares, and adjusts operating extruder system temperatures. Other extruder temperature controllers that continuously monitor, compare, and adjust operating extruder system temperatures function well when the extruder screw is operated at a constant speed. Such extruder temperature controllers provide extruder systems with an additional ability to store and retrieve reset values upon speed changes. The increased operational flexibility of an extruder temperature controller that includes the adaptive reset temperature controller of the invention provides economic advantages by reducing the amount of wasted extrusion material that is created when the screw speed is changed during operation. These economic advantages of such a "dual extruder temperature controller" are especially realized with processes that have continual or unanticipated screw speed changes. The step of delaying a control alarm of an extruder temperature controller operated by the method of the invention also improves operational flexibility by permitting the extruder system to utilize its design capacity for operating the heat exchange means at or near maximum capacity.

The dual extruder temperature controller operated by the preferred embodiment of the invention maintains stable and accurate temperature control of extruder barrel zones even during continual or unanticipated screw speed transitions. The preferred embodiment of the invention is an improvement of the method for operating a controller as described in U.S. Pat. No. 5,149,193 to Faillace, herein incorporated by reference. The Faillace disclosure is incorporated for its description of terms that are standard in the art, the description of extruder systems in general, and the description of an extruder temperature controller with an adaptive reset.

An extruder system that incorporates an extruder temperature controller operated by the method of the invention has a barrel with an axis and at least one heat exchange zone along the axis. The extruder system has a screw within the barrel and a shell surrounding the barrel. A "heat exchange zone" is a portion of the barrel and a corresponding portion of the shell wherein the temperature can be controlled by a heat exchange means. A heat exchange means is provided for each heat exchange zone. The heat exchange means includes heat exchange elements for exchanging heat in each heat exchange zone. The heat exchange elements have a heat exchange element power means.

The extruder system operated by this invention can include a step of determining an actual screw speed. A means for determining the actual screw speed includes a means for sensing the actual screw speed and a means for producing an actual screw speed input signal for the extruder temperature controller. The extruder system has a temperature reset value signal input means for inputting a temperature reset value signal representative of a desired barrel temperature reset value for each member of a plurality of selected, stored screw speeds. The extruder system has a storage means for independently storing each temperature reset value signal. The extruder system has a means for comparing and selecting that compares the actual screw speed to each of the plurality of stored screw speeds and selects a default screw speed from the plurality of stored screw speeds. The default screw speed has a smaller deviation from the actual screw speed than any other member of the compared, stored screw speeds. The selection of the default screw speed determines the temperature reset value signal that is retrieved by the extruder temperature controller of the invention.

The extruder system can also perform the step of generating the control output driver signal. A means for generating as described above is responsive to the stored temperature reset value signal. The means for generating is desirably an "output driver" and is responsive to the stored temperature reset value for the default screw speed. The means for generating includes a means for varying the control output driver signal for each heat exchange zone. The means for varying is actuated when the means for comparing and selecting is actuated due to the existence of a significant deviation between actual screw speed and the selected screw speed. The temperature reset value control setpoint controls the heat exchange power means for each heat exchange zone to provide a temperature in each heat exchange zone.

FIG. 1 illustrates a barrel portion of an extruder system 1 having two adaptive reset temperature controllers 22 operated by the invention. The extruder system 1 contains a driving or extruder screw 10 housed within an extruder barrel 12. The rotation of the extruder screw 10 forces molten extrusion material, such as plastic, along the axis of the extruder barrel 12. The extruder barrel 12 includes at least one and, desirably, a plurality of heat exchange zones 14. Each heat exchange zone 14 contains a heat exchange element 15 for heating or cooling the extruder barrel 12. The heat exchange element 15 comprises, for example, resistive heating elements 18 to increase the temperature of a heat exchange zone 14 and tubes 20 to circulate water or another coolant around the heat exchange zone 14 in order to decrease the temperature of the heat exchange zone 14. A digital encoder 16 determines the actual screw speed and provides a screw speed input signal 17 to the adaptive reset temperature controller 22. Panels having keyboards for the input of control signals and a display (not shown) are known in the art and can be provided as described in the Faillace Reissue Patent that is cited above.

Each adaptive reset temperature controller 22 is, desirably, dedicated to one heat exchange element 15. The heat exchange element 15 of a single heat exchange zone 14 is regulated by the adaptive reset temperature controller 22 in response to a pair of temperature measurements taken in the heat exchange zone 14. A deep temperature sensor or "A" thermocouple 24 is placed near the inner surface 28 of the extruder barrel 12 and, desirably, contacts a liner 3 to provide a deep temperature signal $T_d$ representative of the temperature deep within the cylinder of the extruder barrel 12. A shallow temperature sensor or "B" thermocouple 26 is placed in the heat exchange element 15 to provide a shallow temperature signal $T_s$ representative of the temperature at the heat exchange element 15 which is the source of thermal energy or of cooling.

Figure 2:
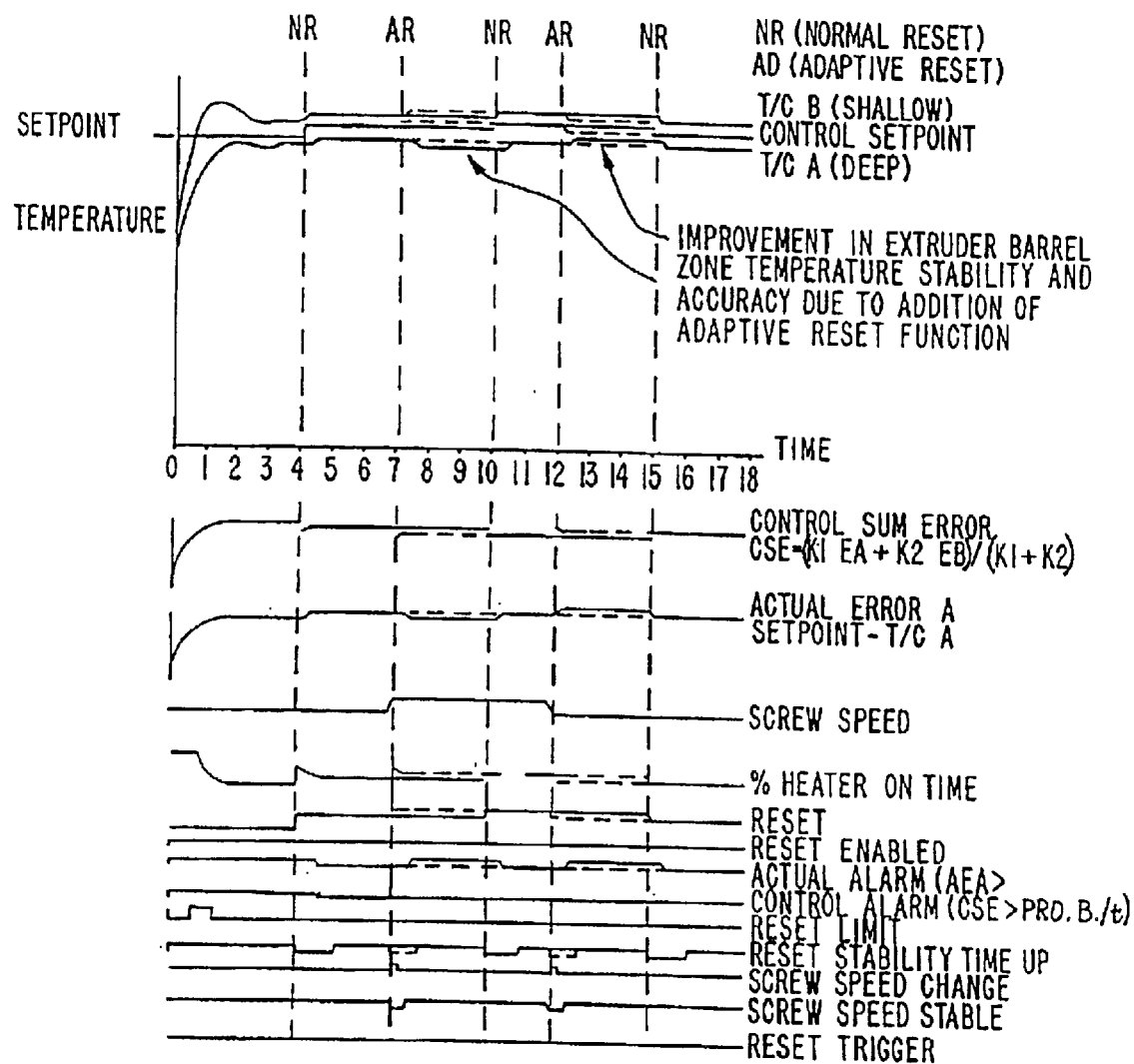
FIG. 2 is an event diagram of the operation of an extruder temperature controller operated by the method of the invention under heat load conditions.

FIG. 2 provides a graphic relationship between various parameters that exist during the operation of the extruder system 1 by the invention. This "event" diagram describes the function of a dual sensor temperature controller under heat load conditions. The dual sensor temperature controller has the "adaptive reset function." The operation of the extruder system 1, represented by FIG. 2, is for a condition wherein the heat exchange zone 14 is in a heating load condition or adding heat to an extrusion material. The extruder system 1 can also be used in a cooling load condition or to cool an extrusion material passing through the extruder barrel 12.

FIG. 2 presents a graph wherein a single x-axis represents time beginning at time $t_0$. The three curves above the x-axis or "time line" represent the temperature of the shallow or "B" thermocouple, the control setpoint value, and the temperature of the deep or "A" thermocouple. The twelve curves below the x-axis or time line represent simultaneous functions for other y-axis values. These other y-axes values are: (1) the control sum error "E"; (2) error "A" or the difference between the setpoint temperature and the temperature of the deep or "A" thermocouple; (3) actual screw speed "$S_d$"; (4) percent heater on time; (5) reset; (6) reset enabled; (7) actual alarm wherein the actual error is, for example, greater than 0.1° Fahrenheit (0.06° Celsius) (Fahrenheit and Celsius are hereinafter symbolized as "° F." or "° C.," respectively); (8) control alarm wherein ($K_1A+K_2B)/(K_1+K_2$)> proportional band (typically 6° F. for heating) for a significant duration of time (typically 60 seconds); (9) reset limit; (10) reset stability time up; (11) screw speed change; (12) screw speed stable; and (13) reset trigger event.

When the extruder system 1 is first activated or at "power on" at time $t_0$, a temperature setpoint controller sets the control setpoint $T_{cp}$ to a value that is equal to the desired temperature of the heat exchange zone setpoint that is selected by the operator. An average error controller asserts heat exchange control signals "H" and "C" as necessary to heat or cool a heat exchange zone. Heat exchange control signal "H" activates the heat exchange element 15 to either increase or decrease the temperature in the heat exchange zone 14. FIG. 2 between time $t_0$ and time $t_4$ illustrates a condition wherein (1) the resistive heating elements 18 are supplying heat and (2) deep temperature signal $T_d$ and shallow temperature signal $T_s$ rapidly rise.

The adaptive reset temperature controller 22 continues to assert heat exchange control signal "H" until time $t_2$ when the control sum error "E" signal has approximately reached zero. The heat exchange control signal "H" is terminated at time $t_2$ and the shallow temperature signal $T_s$ ceases to rise and begins to fall as the resistive heating elements 18 cool. Residual heat stored in the heat exchange element 15 continues to heat the extruder barrel 12. The deep temperature signal $T_d$ continues to rise until time $t_3$ when the deep and shallow temperatures stabilize.

FIG. 2 illustrates the extruder system 1 as being stabilized at time $t_4$ and as having an actual error "A" signal of greater than 0.1° F. (0.06° C.). The value for actual error sensitivity can be selected by the manufacturer or programmer of the extruder temperature controller. An actual error sensitivity is, typically, between 0.05° F. and 1° F. (about 0.03° C. and 0.6° C.). FIG. 2 illustrates the operation of an adaptive reset temperature controller 22 of the preferred embodiment of the invention wherein either a "normal reset" function can occur or an "adaptive reset" can occur due to a screw speed change. The curves of FIG. 2 represented by a solid line occur with a normal reset temperature controller. Curves represented by a broken line occur with an adaptive reset temperature controller.

A setpoint $T_D$ can be entered by the operator. The setpoint $T_D$ is representative of the desired temperature for the extruder barrel zone. The first normal reset resolved by the adaptive reset temperature controller 22 occurs in FIG. 2 at time $t_4$. The normal reset temperature controller resolves a new value for control setpoint $T_{cp}$ which increases the "percent heater on time" of the heat exchange element 15.

The curve for the deep or "A" thermocouple decreases between time $t_7$ and time $t_{10}$ due to a screw speed change. The preferred embodiment of this invention adds an additional four minute delay to the operator's selection of a three or four minute reset stability time. Therefore, seven or eight minutes separate time $t_7$ and time $t_{10}$. An increase in screw speed causes a heat load or a requirement to increase the heat applied by the heat exchange element 15. The temperature of the deep or "A" thermocouple normally decreases in this condition until a normal reset occurs at time $t_{10}$.

The curve for reset illustrates both normal and adaptive resets for controlling an extruder system. A first active "normal" reset is at time $t_4$. The solid line for the reset value illustrates two other normal resets with the first occurrence at time $t_{10}$ and the second occurrence at time $t_{15}$. The broken lines for the reset function represent an occurrence of "adaptive reset" as provided by the adaptive reset controller (described below). The curve illustrates two adaptive resets with the first occurrence at time $t_7$ and the second occurrence at time $t_{12}$.

The adaptive reset controller operated by the method of the invention anticipates the reset value at time $t_7$ as represented by the broken line for reset. This anticipation of the reset value changes the control setpoint at time $t_7$ as represented by the broken line for this value. The changes in control setpoint actuate the "percent heater on time" at time $t_7$ as represented by the broken line for this reset value. The actuation of the percent heater on time maintains a constant temperature in the heat exchange zone 14 as represented by the broken line for the deep or "A" thermocouple. The maintenance of the temperature effectively eliminates a variation in actual error "A." Actual error "A" is the setpoint value less the deep temperature $T_d$ value.

Adaptive reset provides the desirable and unexpected results of anticipating a requirement to alter the control setpoint and, thereby, effectively eliminates a fluctuation in the temperature at the deep or "A" thermocouple. The adaptive reset controller anticipates and changes the energy to the heat exchange means of an extruder system. This change is performed in order to offset a change in the thermodynamic load due to a stable change in screw speed of that extruder system.

The heater, in an extruder system for processing plastic material, is typically operating with at least some percent heater on time as long as the extruder system is in operation or under a load. The maintenance of a constant temperature within an extruder system under a load is indicative that the extruder system cannot obtain a theoretical "infinite gain" or average error of zero. For this reason, an extruder system operating, for example, at 300° F. (about 150° C.) has an offset temperature that provides at least some percent heater on time to maintain the 300° F. (about 150° C.) temperature. A theoretically perfect extruder system has a zero average error and at 300° F. (about 150° C.) the heater has a zero percent on time when the extruder system is in a stable load condition. The control sum error "E" is, therefore, directly proportional to the load on the extruder system.

The percent heater on time is derived from the control sum error. The control sum error "E" is never zero in actual operation of an extruder system unless that extruder system is has no load. The control sum error "E" is derived from two errors "A" and "B." The two errors "A" and "B" are derived from the control setpoint value. Error "A" is the control setpoint $T_{cp}$ value less the deep temperature $T_d$ value. Error "B" is the control setpoint $T_{cp}$ value less the shallow temperature $T_s$ value.

The adaptive reset controller 38 operated by the method of this invention initiates a new value for the control sum error "E" as represented by the broken lines of the curve beginning at time $t_7$ and time $t_{12}$. This adjustment in control sum error "E" is actuated by a stable change in screw speed. The adjustment in control sum error "E" avoids a change in the curve or value of actual error "A" as represented by the broken line for this value. A lack of change in the value of actual error "A" indicates that the temperature at the deep or "A" thermocouple has not change.

The extruder temperature controller operated by the method of the invention desirably provides protective logic control functions to allow the extruder system to stabilize after a reset. These control functions allow the extruder system sufficient time, such as three minutes, to stabilize within a desired temperature variation, such as 0.1° F. (0.06° C.). The controller operated by this invention imposes an additional four minute or comparable time delay if the adaptive reset temperature controller sends a stored reset value to the dual sensor temperature controller. These control functions prevent unnecessary and undesirable resets from occurring. An example of such a control function is provided by a reset stability time. Another control function allows the extruder system to "ramp up" to speed without actuating a new reset value until the operating speed is obtained. The extruder system can include other control functions or operating steps for terminating its operation when an operating condition exists that can damage the extruder system. These functions which can include control alarm and flag functions are described in the Faillace Reissue Patent and are represented in FIG. 2.

Figure 3:
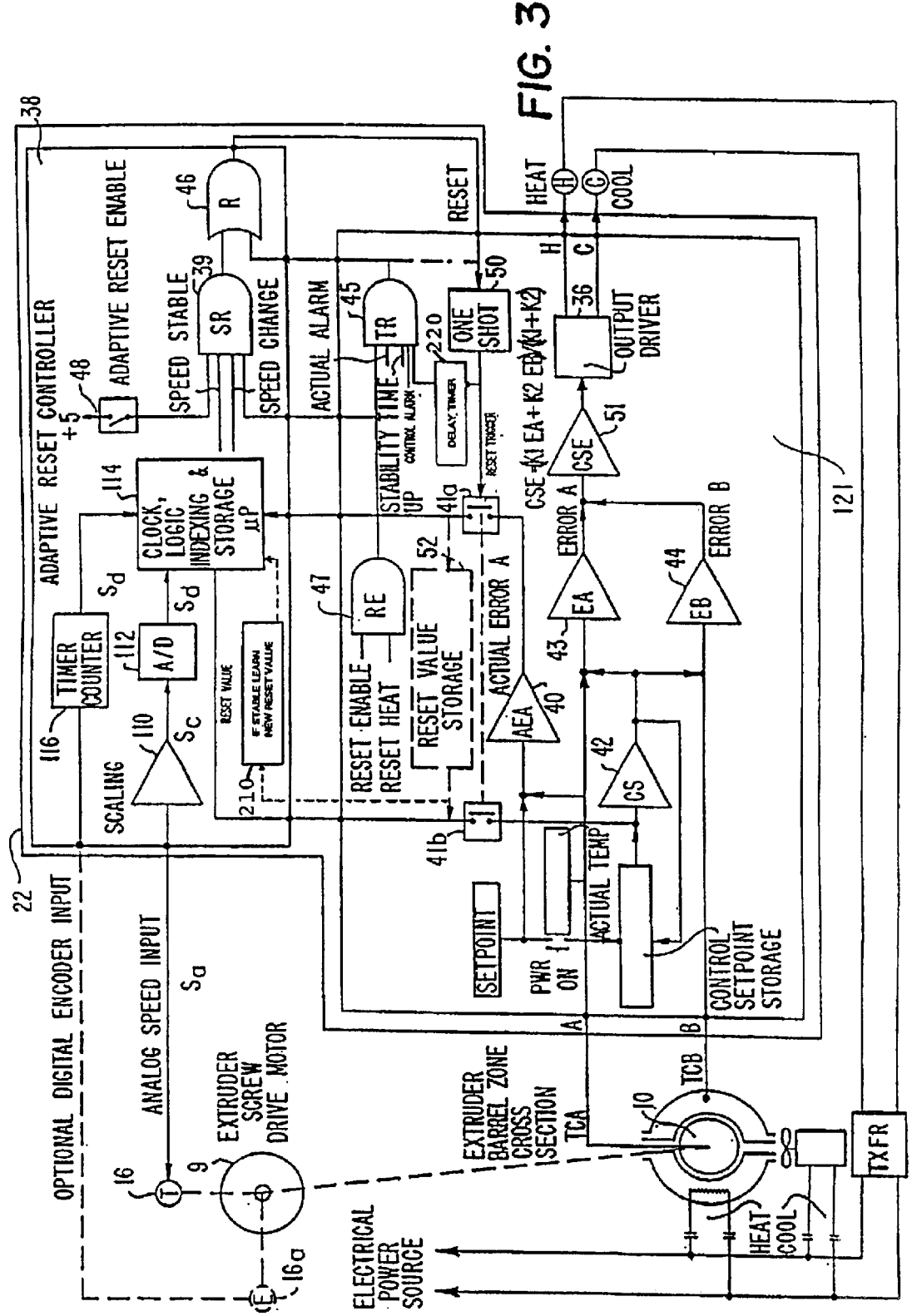
FIG. 3 is a block diagram of an extruder temperature controller that includes an adaptive reset controller with a means for delaying a control alarm for a predetermined time operated by the method of the invention.

FIG. 3 illustrates an adaptive reset temperature controller 22 operated by the preferred embodiment of the invention. An adaptive reset temperature controller 22 operated by the method of the invention is an improvement over the extruder temperature controller methods known in the art and described above for the Faillace Reissue Patent and the Faillace '193 patent. The adaptive reset controller 38 adjusts the reset value $R_n$ and the control setpoint $T_{cp}$ upon a change in the screw speed. This adjustment for screw speed preempts any significant change in barrel temperature upon the change in the screw speed. The adaptive reset controller 38 can be used with a single sensor extruder temperature controller.

A screw speed sensor or tachometer 16 provides the adaptive reset controller 38 with an analog screw speed signal $S_a$ representative of the present or actual speed of the extruder screw 10. The embodiment of this figure illustrates the extruder screw drive means 9. A scaling buffer 110 receives the analog screw speed signal $S_a$ and generates a corresponding screw speed signal $S_c$. The corresponding screw speed signal $S_c$ is scaled to be within the input range of an analog to digital converter (A/D) 112. The analog to digital converter 112 converts the corresponding screw speed signal $S_c$ to a digital screw speed signal $S_d$ which is representative of the screw speed. An alternative digital speed input means with a timer counter can be used. The resulting screw speed signal is sent to a clock, logic, indexing, and reset storage means 114.

FIG. 3 illustrates an optional speed sensor or digital encoder 16a. The speed input from the digital encoder 16a is processed by a timer counter 116. The resulting digital screw speed signal $S_d$ is sent to the clock, logic, indexing, and reset storage means 114.

The adaptive reset controller 38 selects a reset value for any given operating screw speed. The reset value $R_n$, once it is resolved, is stored in the clock, logic, indexing, and reset storage means 114 at an address determined by digital screw speed signal $S_d$. The clock, logic, indexing, and reset storage means 114 provides logic control signals including a speed stable signal and speed change signal, to a first AND gate 39. A switch 48 allows a reset value to be stored and retrieved. The switch 48 is operator selectable and provides an adaptive reset enable signal to the first AND gate 39. The first AND gate 39 signal is sent to an OR gate 46. The OR gate 46 provides a signal to the reset switch 41a and b.

The clock, indexing, and reset storage means and the other subcomponents that are necessary to operate the preferred embodiment of the invention, are provided by commercially available electronic components. The level of skill within the electronic component programming art is sufficient to program a clock, logic, indexing, and reset storage means to provide both (i) a means for indexing and storing a plurality of screw speeds and (ii) a means for comparing, timing, and selecting, via electronic or other logic circuitry, as required by this invention. A suitable clock, logic, indexing, and reset storage means is provided by a properly programmed, commercially available microprocessor. The logic circuit is required for determining the existence or nonexistence of the various comparing and timing parameters such as the satisfaction of the "speed stable" condition.

The clock, logic, indexing, and reset storage means 114 of this improved adaptive reset temperature controller 22 has multiple screw speed storage locations. The preferred embodiment uses at least 11 screw speed storage locations. The logic circuit used by the preferred embodiment also includes programming to clear stored values when significant process changes are detected.

The adaptive reset controller 38 used by the preferred embodiment of the invention includes an optional logic circuit 210. The logic circuit 210 is commercially available and can be separate from the clock, logic, indexing, and reset storage means 114 or incorporated into the circuitry of the clock, logic, indexing, and reset storage means 114. The logic circuit 210 is programmed to "learn" reset values of screw speeds when the temperature is stable. The logic circuit 210, therefore, permits the adaptive reset temperature controller 22 to add or refine reset values that are not triggered by a dual sensor temperature controller. The level of skill within the electronic component programming art is sufficient to program the logic circuit 210 for this function.

The adaptive reset temperature controller 22 used by the preferred embodiment of the invention has a dual sensor temperature controller 121 such as the extruder temperature controller of the Faillace '193 patent. The dual sensor temperature controller 121 monitors logic control signals including a reset enable signal, a reset limit off signal, an actual alarm signal, a stability time up signal, and a control alarm "not" signal. The reset enable signal and the reset limit "not" signal are provided to a second AND gate 47. The second AND gate 47 provides a signal to the first AND gate 39 and to a third AND gate 45. The actual alarm signal, the stability time up signal, and the control alarm off signal are provided to the third AND gate 45. The third AND gate 45 signal is also sent to the OR gate 46.

The dual sensor temperature controller 121 used by this invention provides improved temperature control in part through the criteria programmed for the third AND gate 45. This criteria for the preferred embodiment of the invention defines actual alarm plus or minus 0.1° F. (0.06° C.). This criteria for actual alarm permits the actual temperature to coincide more precisely with the temperature setpoint for the heat exchange zone. The criteria for the preferred embodiment of the invention permits control alarm to trigger a reset value when the adaptive reset temperature controller 22 generates a control output driver signal to the heat exchange means at or near maximum capacity for up to one minute. This criteria permits the extruder system to operate at or near its maximum capacity.

The OR gate 46 provides a single event trigger signal via a "one shot" multivibrator signalling device 50 to reset switch 41a and b. A delay timer 220 delays the triggering of a new reset value if the adaptive reset controller 38 applies a stored reset value to the dual sensor temperature controller 121. The delay timer 220 delays the criteria for triggering a reset value from the dual sensor temperature controller 121 for a selected time. The selected time for delay in the preferred embodiment of the invention is four minutes. The delay timer 220 prevents oscillation in actual temperature.

The reset switch 41a and b inputs the actual error "A" signal to the clock, logic, indexing, and reset storage means 114 and has a reset value storage means 52 as shown. The reset value storage means 52 signals the logic circuit 210. The dual sensor temperature controller 121, when it is stabilized, provides the reset value $R_v$. Actual error "A" is provided to the adaptive reset controller 38 when the reset switch 41a and b receives a reset trigger.

The reset trigger is produced in one of three conditions. The first condition is "adaptive reset" and occurs when (1) the changed or new screw speed has stabilized, (2) there is a speed change, (3) reset is enabled, and (4) adaptive reset is enabled. The second condition is "stable adaptive reset" and occurs when (1) the screw speed is stable, (2) the stable speed change is maintained for a selected time (preferably one minute), (3) the device has not reached a reset limit and maintained the reset limit for a selected time (desirably one minute), (4) reset is enabled, and (5) adaptive reset is enabled. The third condition is "normal reset" and occurs when (1) reset is enabled, (2) the device has not reached a reset limit and maintained the reset limit for a selected time (desirably one minute), (3) there is an actual alarm, (4) the device has not reached a temperature limit, (5) stability time is up, and (6) there is no control alarm.

The dual sensor temperature controller 121 used by the preferred embodiment of the invention has a first comparator 40, a second comparator 42, a third comparator 43, a fourth comparator 44, and a fifth comparator 51. The first comparator 40 algebraically adds the setpoint value and deep temperature $T_d$ value to derive the actual error "A" which is provided to the reset switch 41a.

When the reset value is asserted by the clock, logic, indexing, and reset storage means 114, a second comparator or control setpoint controller 42 adjusts the control setpoint $T_{cp}$ at the time of "reset trigger." At "power on" control setpoint is set to equal setpoint. The control setpoint controller 42 asserts the control setpoint $T_{cp}$ and provides the signal to the third comparator 43 and the fourth comparator 44. The dual sensor temperature controller 121 performs an algebraic addition by the third comparator 43 for computing an error "A" signal. The third comparator 43 exerts error "A" signal to the fifth comparator 51. The fourth comparator 44 compares the shallow temperature $T_s$ with the control setpoint $T_{cp}$ and derives error "B" signal. Error "B" is also provided to the fifth comparator 51.

The adaptive reset controller 38 provides the control setpoint controller 42 with the reset value $R_v$ indicating the extent to which the control setpoint is to be adjusted. The magnitude of reset value $R_v$ is scaled by the control setpoint controller 42 with an arithmetic module a scaled reset value $R_n$ according to the following equation (1).

$$R_n = r_g \times R_v \qquad (1)$$

wherein $r_g$ is a constant reset gain. Typically, the reset gain $r_g$ is set at a value of "1." The new or scale reset value $R_n$ is provided to the control setpoint controller 42. The control setpoint controller 42 then performs an algebraic add of the scaled reset value $R_n$ to the control setpoint $T_{cp}$ to update the control setpoint $T'_{cp}$ at the time of reset trigger according to the following equation (2).

$$T'_{cp} = R_n + T_{cp} \qquad (2)$$

The dual sensor temperature controller 121 remains stable with an actual error of less than 0.1° F. (0.06° C.) once the adaptive reset temperature controller 22 has resolved a scaled reset value $R_n$. However, a significant change in the thermal load to the extrusion system causes a change in the heat exchange zone deep temperature $T_d$. The dual sensor temperature controller 121 becomes unstable as it seeks to correct the changes of the heat exchange zone deep temperature $T_d$. The adaptive reset temperature controller 22 includes a dual sensor temperature controller 121 for generating control output driver "H" and "C" signals for heating and for cooling to selectively activate the heat exchange element 15. The third and fourth comparators 43 and 44 generate, respectively, error signals "A" and "B" representing the difference between the control setpoint $T_{cp}$ and the temperature signals $T_d$ and $T_s$, respectively. An arithmetic module in the fourth comparator 51 computes a control sum error E, according to the following equation (3).

$$E = \frac{K_1 A + K_2 B}{K_1 + K_2} \qquad (3)$$

where $K_1$ and $K_2$ are constants chosen to provide the appropriate weight to each error signal "A" and "B." In response to the control sum error "E," a heat exchange driver or controller 36 adjusts control output driver signals "H" and "C" to activate selectively either the resistive heating elements 18 or the fluid cooling system (not shown) which provides coolant flow through the tubes 20 of the heat exchange element 15 until the control sum error "E" is minimized.

The logic path for the adaptive reset temperature controller 22 has the clock, logic, indexing, and reset storage means 114 monitoring the digital speed signal $S_d$ to determine when a change in screw speed occurs. When digital speed signal $S_d$ changes, the clock, logic, indexing, and reset storage means 114 selects the stored reset value and signals the dual sensor temperature controller 121. The dual sensor temperature controller 121 then recalculates the control setpoint $T_{cp}$ using equation 2 above.

The AND gate 39 determines when the dual sensor temperature controller 121 has stabilized at the new reset value. Once the dual sensor temperature controller 121 has stabilized, the AND gate 39 receives the reset criteria signals defined above. The reset value $R_v$ is stored in the table of the clock, logic, indexing, and reset storage means 114 at an entry corresponding to the current operating screw speed indicated by the digital speed signal $S_d$.

The invented method for operating the extruder temperature controller of FIG. 3 applies deep and shallow temperature controls with temperature resets to continual thermal load change processes. The invention provides a means of anticipating thermal load changes due to screw speed changes. The invention applies a temperature reset value for each heat exchange zone 14 based on specific extruder operation speeds or an "adaptive reset" in advance of actually sensing the thermal load change. Adaptive reset resolves or "learns" a reset value for each heat exchange zone 14 at all of the normal operating screw speeds. As the screw speed of the extruder is altered, adaptive reset applies or "recalls" the last temperature reset value which has been learned for each heat exchange zone 14 by a previous reset calculation for that heat exchange zone at that given screw speed. This function is provided by means for comparing and selecting, during operation of an extruder system that (i) corresponds a stabilized operating temperature reset value to each of the operating screw speeds and (ii) enters the actual screw speed with the corresponding temperature reset value into the means for storing.

The extruder temperature controller operated by the invention senses the screw speed via a standard analog input and applies the screw speed as an index or pointer to a table of learned reset values. These stored reset values can be recalled for each heat exchange zone after the screw speed is altered and stabilized to a new screw speed. A table of 100 addresses, in the preferred embodiment, which represents the reset value for 1 percent to 100 percent of the available screw speed is used for each heat exchange zone. The learned reset value is resolved as it is in the extruder temperature controller of the Faillace '193 patent. However, the learned reset value is stored in a nonvolatile reset value storage table, such as an EEPROM memory storage device, at the location specific to the screw speed at the time the reset value is calculated.

When the new screw speed of the extruder system is altered and stabilized and the temperature reset criteria is met, a new temperature reset value is calculated for the new screw speed and stored in the reset value table at its respective address representing that screw speed. This adaptive reset sequence repeats for each new operating speed as it is encountered with a resolution of one percent of full screw speed.

The method of the invention for controlling extruder temperature can be performed by commercially available controllers. The adaptive reset temperature controller 22 described above is desirable to use with the method of the preferred embodiment of the invention. The program language used to perform the method of the invention can vary according to the preference of the operator and/or the controller selected by the operator. The procedures performed by a controller using the method of the invention are described below. The abbreviations in the following table are adopted to describe the method.

TABLE

| | |
|---|---|
| TC A | Deep thermocouple (TC nearest screw). |
| TC B | Shallow thermocouple (TC in the heater). |
| Deviation | Error between operator setpoint and TC A (TC A - operator setpoint). |
| Delta TC A | The range of TC A over some time period. |
| CUM Reset | A measure of thermal loading in degrees. |
| Control Setpoint | Sum of operator setpoint and CUM reset. |
| CSE Control Sum Error | Deviation of control setpoint and TC A. |
| Reset Stability Timer | Four minute timer measuring the stability of the process. When it "times" out a new calculation of CUM reset is triggered. |

TABLE-continued

| | |
|---|---|
| Control Alarm | 60 second timer measuring the duration of timer 100 percent heating or cooling. |
| Reset Delay Timer | 240 second timer delaying the timing of the reset stability timer after a new CUM reset is applied from the adaptive reset algorithm. |
| Proportional Band | The amount of temperature deviation will cause 100 percent output. |

The following description of the programming performed by the method of the invention is "pseudocode" and can be translated into a specific code language by one having ordinary skill in the art. The parameters such as time and temperature can be varied according to the desires of the operator. For example, when using the preferred controller, all temperature settings are in Fahrenheit units set at a tenth of a degree resolution. Also, certain subprocedures are optional and can be deleted by one having ordinary skill in the art as necessary to conduct a specific extrusion method.

Adaptive Reset Controller Specifications

The method of the invention includes a procedure for setting an adaptive reset controller. The following pseudocode is specific to the adaptive reset controller 38 described above, but it can be modified by one having skill in the art for use with comparable controllers.

This procedure desirably begins by initializing the controller. Initializing occurs by setting the maximum percent speed to zero percent, setting the minimum percent speed to 100.0 percent, and setting the "old speed step reset" value to 32767. This numeral setting is arbitrary and specific to the preferred embodiment of the controller described above. Initializing of the "reset learn timer." If the adaptive reset is not enabled, then clear all learned bits, clear all reset values in the table, set the "old speed step reset" value to 32767, and do not execute the rest of the algorithm.

Calculating the change in operator setpoint then occurs. The delta setpoint equals the previous setpoint minus the operator setpoint.

The method then involves setting the previous setpoint to the operator setpoint. If the unlearn inhibit is not on and the delta setpoint is beyond +/−15° F., then clear all the learned bits except for the speed step zero, clear all reset values in the table except for speed step zero, and set the "old speed step reset" value to 32767.

The process involves checking the speed input for limits. If the percent speed is less than zero, then set the speed to zero. If the percent speed is greater than 100.0 percent, then set the speed to 100.0 percent. Then proceed with the appropriate one of either of the two following conditions.

(1) If the speed had been determined to be stable, then move the percent speed into maximum percent speed, move the percent speed into minimum percent speed, and calculate the difference between the current percent speed minus the stable percent speed. If the difference is beyond four percent or the current percent speed equals zero and if the current percent speed does not equal stable percent speed, then reset the speed stable bit. If speed stable bit is still set, then calculate the new speed step wherein the new speed step equals the current percent speed plus 4.5 percent divided by 10. If the new speed step is less than zero, then set to zero. If the new speed step is greater than ten, then set to ten. If the new speed step is equal to the current speed step, then move the current percent speed to the stable percent speed and set the applied bit.

(2) If the speed stable bit is not set, conduct the following procedure. If current percent speed is greater than the maximum percent speed, then move the current percent speed to the maximum percent speed. If the current percent speed is less than the minimum percent speed, then move the current percent speed to the minimum percent speed.

The method of the invention then involves calculating the delta percent speed. The delta percent speed equals maximum percent speed minus minimum percent speed. The following steps are then performed.

(1) If the delta percent speed is greater than 2.0 percent, then move the current percent speed to the minimum percent speed, then move the current percent speed to the maximum percent speed, then reinitialize the speed stable timer.

(2) If the speed stable bit is not set and the delta percent speed is less than or equal to 2.0 percent, then allow the speed stable timer to time, else reinitialize the speed stable timer.

(3) If the speed stable bit is set, then reinitialize the speed stable timer.

(4) If the speed stable timer is done, then set the speed stable bit, calculate the current speed step wherein the current speed step equals the current percent speed plus 4.5 percent divided by 10. If the current speed step is less than zero, then set to zero. If the current speed step is greater than ten, then set to ten. Reset the applied bit, move current percent speed to stable percent speed, set the old speed step reset value to 32767, and reinitialize the speed stable timer.

(5) If the speed stable bit is not set, then skip the rest of the routine.

(6) If the learn inhibit is set, or if the learned bit for the current step is set, or if the delta TC A is greater than or equal to 4.9° F., or if the control alarm timer is done, or if the reset delay timer is timing, then reinitialize the reset learn timer.

(7) If the learn inhibit is not set and the learned bit for the current step is not set, and the delta TC A is less than 4.9° F., and the control alarm timer is not done, and the reset delay timer is not timing, and the TC A deviation is at or within +/−0.1° F., then allow the reset learn timer to time (for example, 150 seconds).

(8) If the learn inhibit is not set and either the reset stability timer is done or the learn timer is done, then, if the current step is learned, (a) move the current step reset value to the "old speed step reset" value, (b) move the CUM reset to the current step reset value, and (c) set the current step learned bit.

(9) If the current step is not zero, and the learn inhibit is not set, and the unlearn inhibit is not set, and the reset stability timer is done, and the current step learned bit is set, and the "old speed step reset" value is less than 299.9° F.; then calculate the difference between the current speed step reset value and the "old speed step reset" value. If the difference is greater than 20.0° F., then clear all learned bits except for speed step zero and the current speed step. Clear all reset values in the table except for speed step zero and the current speed step.

(10) If the applied bit is not set, and the apply inhibit is not set, and the current speed step learned bit is set, then move the current speed step reset value to CUM reset. Set the applied bit. If reset stability timer is not done, then set the adaptive reset learned value applied bit.

Optional Adaptive Reset Controller Specifications

The most desirable embodiments of the method of this invention include one or more subprocedures. These subprocedures refine the operation of the extruder system. The most desirable subprocedures for use with this invention are as follows. These subprocedures are best accomplished with use of global status bits: (1) speed stable bit, (2) learn inhibit bit (3) apply inhibit bit, (4) unlearn inhibit bit, and (5) applied bit.

Clearing the adaptive reset table can be performed by the operator. This procedure can be performed by clearing the table of reset values including step zero. This procedure clears all learned bits except for the zero speed step.

Changes in the operator temperature setpoint values can be interpreted as a significant process change. Therefore, the learned bits except for the zero speed step are cleared, if the operator temperature setpoint or the reset value for the speed step changes significantly, for example, by 15° F. (adjustable).

A desirable embodiment of the method of this invention includes checking the speed step criteria. The adaptive reset table of the preferred controller has 11 speed steps at 10 percent speed increments. The speed increments are (1) zero percent, (2) 1 to 10 percent, (3) 11 to 20 percent, and (4) 91 to 100 percent. With each speed step in the adaptive reset table there are associated status bits. In the PLC or controller, there are learned status bits to aid in control of adaptive reset algorithm. For the adaptive reset table there will be one word of learned status bits. Speed setpoint is to be used as the input. The use of speed setpoint requires that the setpoint input value consider drive status and deviations between actual and setpoint speed values. For example, if drive is stopped, setpoint input value must be zero. If speed range is within two percent of full scale speed for five seconds (time is adjustable), then speed is considered stable. Speed step location within the adaptive reset table is calculated by dividing the percent speed value by ten. If new stable speed differs by four percent or more from previous stable speed, then clear the applied bit, and consider the speed step as "changed." Speed stability is not tested until current speed step is considered changed.

A desirable embodiment of the method of this invention includes checking the "learn" criteria. This procedure occurs when speed is stable and the "learn inhibit" bit is not set. The new cumulative reset is calculated by either temperature control or if (1) the zone has been within +/−0.2° F. of setpoint, (2) does not have the learned bit set, (3) delta TC A does not exceed 4.9° F., and (4) is not in control alarm for 2.5 minutes, then cumulative reset is entered into the adaptive reset table and the learned bit is set for the speed step. If the learned bit is not yet set and it learns, then the applied bit is also set.

Another desirable embodiment of the method of this invention includes checking the "unlearn" criteria. This procedure occurs when speed is stable, the "unlearn inhibit" bit is not set, and the learned bit is set. If the new learned value differs from the old learned value by more than 20° F. (adjustable) and not at the zero speed step, then clearing of all learned bits except for the zero speed occurs.

Another desirable embodiment of the method of this invention includes checking the "apply" criteria. This procedure occurs when speed is stable, the applied bit is not set, the "apply inhibit" bit is not set, and if the speed step has a learned bit. If the above is true, then the cumulative reset of the zone from the adaptive reset table value is set.

Dual Sensor Temperature Controller Specifications

The method of the invention can include a procedure for setting the dual sensor temperature controller 121. This procedure desirably begins by initializing the controller. Initializing occurs by clearing CUM Reset and setting TC A to a maximum of −1,000° F. Initializing continues by setting TC A to a minimum of +1,000° F., moving operator setpoint to control setpoint, and initializing each of the reset stability timer, the control alarm timer, and the reset delay timer. When the controller of the Faillace '193 patent is used, initializing includes setting the "old speed step reset" value to 3,276.7° F. This numeral setting is arbitrary and specific to the preferred embodiment of the controller described above.

The method involves calculating the control sum error wherein the control sum error equals control setpoint minus [(TC A+TC B)/2]. This calculation desirably includes parameters such that if in HEAT domain, then the default heat gain is MEDIUM; if LOW gain, then proportional band is 30.0° F.; if MEDIUM gain, then proportional band is 12.0° F.; and if HIGH gain, then proportional band is 6.0° F. If in COOL domain and if air cooling, then the default cool gain is MEDIUM; if LOW gain, then proportional band is 30.0° F.; if MEDIUM gain, then proportional band is 15.0° F.; and if HIGH gain, then proportional band is 7.5° F. If in COOL domain and if water cooling, then default cool gain is MEDIUM; if LOW gain, then proportional band is 40.0° F.; if MEDIUM gain, then proportional band is 20.0° F.; if HIGH gain, then proportional band is 10.0° F. Further, if the control sum error is greater than or equal to the proportional band, then set bit for zone at 100 percent heating or cooling.

Calculating the percent output for control variable is performed such that control variable equals the value control sum error divided by proportional band multiplied by 100 percent. If the zone is at 100 percent heating or cooling, then set the control alarm timer for 60 seconds, else reinitialize the control alarm timer. If reset stability timer is done or delta TC A is greater than or equal to 4.9° F., then move current TC A to TC A maximum and move current TC A to TC A minimum. If current TC A is greater than TC A maximum, then move current TC A to TC A maximum. If current TC A is less than TC A minimum, then move current TC A to TC A minimum.

Calculating delta TC A then occurs wherein delta TC A equals TC A maximum minus TC A minimum. If adaptive reset learned value is applied or the reset delay timer is timing, and adaptive reset speed is stable, then allow the reset delay timer to time up to 240 seconds.

Calculating the change in operator setpoint is performed wherein delta setpoint equals current operator setpoint minus previous operator setpoint. If reset stability timer is not done, and (1) delta TC A is less than 4.9° F., (2) control alarm timer is not done, (3) reset delay timer is not timing, (4) Deep TC deviation is not within +/−0.1° F., and (5) the operator setpoint did not change by more than 1.5° F., then allow the reset stability timer to time, else reinitialize the reset stability timer.

The method can involve setting previous operator setpoint equal to current operator setpoint. If reset stability timer is done, then if deep deviation is greater than +/−1.5° F., then subtract the deep deviation from the CUM reset value, then if Deep deviation is less than or equal to +/−1.5° F., then subtract a third of the deep deviation from the CUM reset value. If CUM reset is greater than 120.0° F., then set CUM reset to 120.0° F. If CUM reset is less than −120.0° F., then set CUM reset to −120.0° F.

Calculating control setpoint then occurs. Control setpoint equals operator setpoint plus CUM reset.

The method then includes calculating time proportioning output. If zone is in heating domain, then the duty cycle is 5.00 seconds. If zone is in cooling domain and if zone is water cooled, then the duty cycle is 5.00 seconds. If zone is in cooling domain and if zone is air cooled, then the duty cycle is 20.00 seconds.

Calculating ON time from percent output is then performed wherein ON time equals percent output multiplied by duty cycle divided by 100.0 percent. If zone is in heating domain or zone is in water cooling domain and if ON time is greater than 4.9 seconds, then set ON time to 5.0 seconds. If zone is in heating domain or zone is in water cooling domain and if ON time is less than 0.03 seconds, then set ON time to 0.0 seconds. If zone is in air cooling domain and if ON time is greater than 18.5 seconds, then set ON time to 20.0 seconds. If zone is in air cooling domain and if ON time is less than 0.5 seconds, then set ON time to 0.0 seconds. If the new ON time is less than the remaining ON time, then reset the DUTY and OFF TIME timers.

Calculating the OFF timer preset then occurs wherein the OFF timer preset equals duty cycle time minus ON time. This procedure with the preferred controller requires that the duty cycle timer is set to RUN and the OFF timer is set to RUN. If duty cycle timer is done, then reinitialize the duty and OFF timers. If zone is enabled and (1) OFF timer is done or OFF timer preset is at zero, (2) no thermocouple fault, and (3) no over-temperature alarm, then if in heat domain turn on heating output or if in cool domain turn on cooling output.

The operation of an extruder system, according to the invention, for the first time at a new operating screw speed has no actual reset value resolved for that initial screw speed. An approximate reset value is calculated by the invention for that screw speed by a straight line approximation between the closest adjacent screw speed reset values which have been resolved. This approximate reset value is stored in the reset value table for the new operating screw speed. However, if the new screw speed is maintained long enough for a new reset value to be calculated based on the normal reset criteria, the approximate reset value is replaced with the actual reset value for the new screw speed.

The invented extruder temperature controller provides the same advantages to an extruder system as the extruder system of the Faillace '193 patent. The extruder temperature controller of this invention provides the additional benefits of more precise temperature control and the optimization of the design capacity of the extruder system. The precise temperature is provided by criteria for actual alarm, the ability to learn reset values under stable conditions, the use of a delay circuit to prevent oscillation in reset value signals and actual temperature, and/or the other characteristics disclosed above. The optimization of the design capacity of the extruder system is provided by the criteria for control alarm that permits additional reset values to be established during the operation of the extruder system at or near its maximum capacity.

I claim:

1. A method for controlling extruder temperature having:
   sensing an actual screw speed for an extruder screw in an extruder barrel, said extruder barrel having at least one heat exchange means;
   indexing and storing a plurality of screw speeds, each of said stored screw speeds corresponds to a temperature reset value;
   comparing said actual screw speed with each of said stored screw speeds;
   selecting one of said stored screw speeds, said selected screw speed being a member of said plurality of stored screw speeds having a value most arithmetically equivalent to said actual screw speed, said step of selecting retrieves said temperature reset value corresponding to said selected, stored screw speed; and generating a control output driver signal to said heat exchange means, said control output driver signal being responsive to said retrieved temperature reset value, wherein the improvement comprises:

delaying a control alarm for a predetermined time when generating a control output driver signal to the heat exchange means is at or near maximum capacity.

2. The method of claim 1 wherein said delaying a control alarm delays triggering a new reset value when an adaptive reset controller applies a stored reset value to a dual sensor temperature controller.

3. The method of claim 2 wherein said delaying said control alarm delays a criteria for triggering said new reset value from said dual sensor temperature controller for a first selected time.

4. The method of claim 3 wherein said selected time for delay is four minutes.

5. The method of claim 4 further comprising learning through a logic circuit a new reset value of said actual screw speed when a temperature in said extruder barrel is stable for a preset time.

6. The method of claim 3 wherein said delay timer prevents oscillation in actual temperature.

7. The method of claim 1 further comprising learning through a logic circuit a new reset value of said actual screw speed when a temperature in said extruder barrel is stable for a preset time.

8. The method of claim 7 wherein said learning through said logic circuit includes establishing a stable adaptive reset when (a) said actual screw speed is stable, (b) a stable speed change is maintained for a second selected time, (c) said adaptive reset controller has not reached a reset limit and maintained said reset limit for a third selected time, (d) reset is enabled, and (e) adaptive reset is enabled.

9. The method of claim 8 wherein said second selected time and said third selected time are each one minute.

10. The method of claim 1 wherein said comparing and selecting during operation of an extruder system (a) correspond a stabilized operating temperature reset value to each said actual screw speed and (b) enter said actual screw speed with said corresponding temperature reset value into said means for indexing and storing.

* * * * *